(12) United States Patent
Love et al.

(10) Patent No.: US 6,760,638 B1
(45) Date of Patent: Jul. 6, 2004

(54) METHOD AND APPARATUS FOR RESOLVING OVERLAPS IN A LAYOUT CONTAINING POSSIBLY OVERLAPPING DESIGNS

(75) Inventors: Brian C. Love, Ghent (BE); Susie Q. Stitzel, Liberty, ME (US)

(73) Assignee: Esko Graphics, NV, Zwijnaarde (BE)

( * ) Notice: Subject to any disclaimer, the term of this patent is extended or adjusted under 35 U.S.C. 154(b) by 0 days.

(21) Appl. No.: 09/573,078

(22) Filed: May 16, 2000

(51) Int. Cl.[7] ............................................. G06F 19/00
(52) U.S. Cl. ...................... 700/98; 358/1.18; 715/517
(58) Field of Search ........................... 700/98, 97, 103, 700/104, 135; 715/502, 526, 527, 520, 517, 518, 521; 716/8–11, 21; 358/1.18; 707/102; 345/792, 798

(56) References Cited

U.S. PATENT DOCUMENTS

| | | | |
|---|---|---|---|
| 5,796,402 A | * | 8/1998 | Ellison-Taylor ............. 345/792 |
| 5,832,494 A | * | 11/1998 | Egger et al. ................. 707/102 |
| 5,889,932 A | * | 3/1999 | Adegeest et al. .......... 358/1.18 |

* cited by examiner

*Primary Examiner*—Leo Picard
*Assistant Examiner*—Steven R. Garland
(74) *Attorney, Agent, or Firm*—Dov Rosenfeld; Inventek

(57) ABSTRACT

A method and apparatus for resolving on a computer system overlaps in a layout including a plurality of possibly overlapping designs, each design including an image and a design mask defining the border of printing of the design. The method includes determining the regions of overlap in the layout and for each, deciding whether or not to modify the overlap and by what modification method. The deciding and selection may include user intervention.

17 Claims, 9 Drawing Sheets

— DIE MARKS

------- MASK BORDER (FOR BLEEDS)
——— DIE MARKS

OVERLAID MASK BORDER

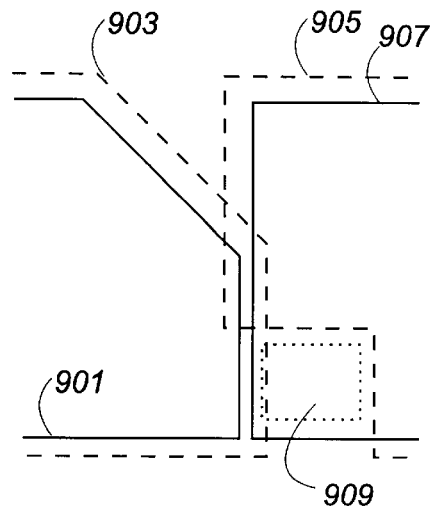
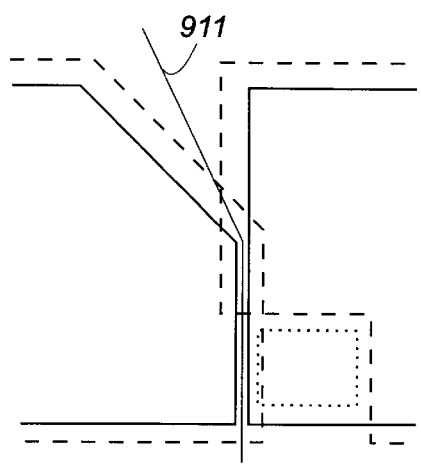
FIG. 9A
FIG. 9B
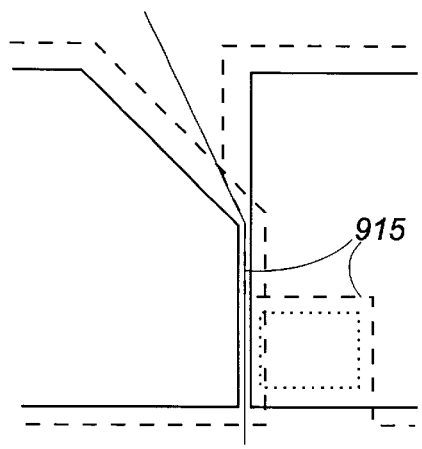
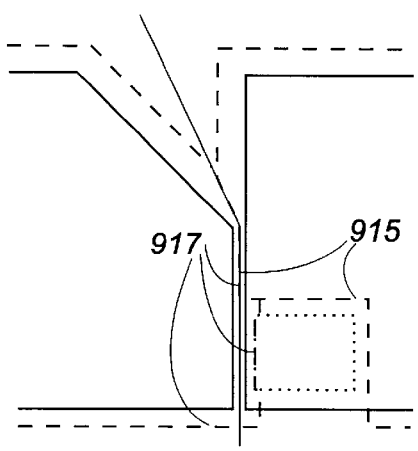
FIG. 9C
FIG. 9D

METHOD AND APPARATUS FOR RESOLVING OVERLAPS IN A LAYOUT CONTAINING POSSIBLY OVERLAPPING DESIGNS

BACKGROUND

This invention relates to printing, and in particular to preparing a layout for printing on a sheet or roll when the layout contains repeating designs.

This invention is most useful for printing packages and labels. A package is a container such as a box on which an image may be directly printed. The package is made from some medium that is provided in sheet form or roll form. The medium is then printed directly according to a layout, and is then trimmed or cut. The printed package is formed by a combination of one or more of folding, bending, and joining. Examples of packages include but are not limited to cereal boxes, cardboard cartons, milk cartons, potato chip bags, and soft drink cans.

A label in the context of this invention is a printed cut out piece of sheet-shaped medium that is attached to a container. Examples include wine labels attached onto wine bottles, plastic shrink wrap wrapped around plastic soft drink bottles, and paper labels on soup cans. While some labels are cut in rectangular form ("square-cut"), e.g., labels on soup cans, others are not. For example, some upper labels on bottles such as ketchup and beer bottles are not square cut.

When packages or labels are printed on the printing press, in order to increase efficiency they are typically printed in large numbers simultaneously on the medium. Furthermore, to minimize waste, the individual designs of packages or labels are repeated on the medium packed tightly together, preferably as closely as possible, and often abutting. We call such a set of repeating designs a "layout."

A package or label is usually designed on a CAD system. ArtiosCAD from Barco Graphics, of Gent, Belgium—the assignee of the present invention—is a CAD system especially configured for packaging design. The system allows the design of the package geometry, and the inclusion of an image, also called graphics or artwork herein, into the package design.

Historically, a die is a metal instrument used to stamp out, or cut out, a final shape from the original media. These days, many different processes are used for cutting, including laser-cutting processes. The term die is now understood to mean the data that describes the cut out regions. When applied to packages or labels, the die is a contour that describes the shape of the package or label after cutting.

A mask is the geometric boundary of the design that will be printed. In packaging design, the mask of the image to be printed on a package is often defined relative to the die of the package. In one simple example, the mask may be a line 1 mm outside the die. Note however, that the mask need not follow the die outline. For example, many boxes contain flaps that do not contain any printing. The mask may fall inside the die outline for such a flap.

A "design" as used herein refers to the combination of the image of a package or label, and may include a single die. The word "station" is sometimes used synonymously with what we call a "design". A design or station is a single instance of a package or label. The die is associated with one or more images.

It is often desirable to have the imaged area (the area containing artwork) in a package or label be slightly larger than the "trimmed" (i.e., cut) area. This is called bleeding, and the enlargement, i.e., the area by which the image is larger than the cutting outline, is called a bleed. Thus, for the example of the mask being a line 1 mm outside the die, we have a 1 mm bleed. Bleeding is done to compensate for any misregistration in the printing or in the cutting of the individual packages or labels. Without bleeding, the misregistration may lead to some of the areas in the package or label remaining unprinted, or the wrong areas being printed with the incorrect imagery. This in general is an undesired effect.

When the package or label designs are laid tightly packed on the medium for printing, the bleeds may overlap. These overlaps must be resolved to prevent the image from one package impression from incorrectly printing over another image of another impression.

SUMMARY

The present invention is a method and apparatus for resolving overlaps in printing layouts that contain a plurality of possibly repeating designs. Each design includes at least an image. There is a mask that defines the border of printing the design. A design may also include a die defining a contour. Because these designs are typically packed tightly together on the layout in order, for example, to conserve material, there may be overlaps contained within at least two masks. It is thus needed to provide a method for preventing the image of one package or label design from incorrectly printing over another. By eliminating the possibility of such incorrect overlaps, the present invention would increase the efficiency of printing packages and labels, and would allow for a more economical use of the material onto which the designs are printed.

One embodiment of the present invention includes the following three steps: 1) identifying overlaps that may require adjustment decisions, 2) presenting this information to the user, for example by way of a Graphic User Interface (GUI), and 3) modifying the masks in the layout according to the response of the user to the information presentation step.

Resolving overlaps in printing layouts that contain repeating designs includes determining where overlaps occur. An embodiment of the present invention identifies overlaps and generates a list of none or more overlap records. A version of the present invention includes organizing these overlap records into a set of none or more groups such that all overlaps in the same group are similarly modified.

One of the possible modifications of any overlap of the images of two designs is visually reversing the order of the overlap. This preferably is implemented by cutting back one of the masks. Alternatively, it may be affected by reversing the order of layering in the layout. Another possible modification method is called the mask split method and includes, in one version, determining a line (a dividing line) between the two designs, for example, between the two dies, and adjusting the masks of one or both designs to not extend beyond the determined dividing line, such that any bleed between the two dies extends only as far as the determined dividing line between the two dies. The dividing line preferably is the medial axis, i.e., the bisecting line midway between the two dies.

The purpose of the first step then is twofold—to recognize and list all possible overlaps, and to organize this information in a second list according to shared attributes.

The preferred embodiment includes a second step wherein these lists of overlap records are displayed to the user, preferably by means of a Graphic User Interface (GUI), along with a set of one or more possible modifications of the designs in the overlap. As described above, the possible modifications include reversing which design of the overlap appears on top of the other design, and the mask split method. Either of these methods is implemented in the preferred embodiment by adjusting one or both of the masks.

An additional step for resolving overlaps in printing layouts is to modify the designs according to the decisions made by the user in the previous step, or, in some embodiments, automatically. In the version that includes presenting the possible modifications to the user, the user manually inputs to the computer system none or one of the set of possible modifications. Subsequently, any necessary modifications to the designs in regions of overlap are made according to the edited decisions input by the user.

According to an improved implementation, for each overlap record displayed to the user, preferred modification is displayed with the set of possible modifications. Failure by the user to input a decision leads to the preferred modification being carried out.

According to another version of the invention, a method is described for resolving overlaps in printing layouts that contain a plurality of possibly overlapping designs that includes determining any regions of overlap in the layout, and, for each determined overlap region, deciding whether or not to modify the overlap region and, if modification is decided, selecting a mask modification. The selection and deciding may include presenting a set of possible modifications to the user. The selection and deciding may also be according to a modification criterion, and then be carried out automatically without further user intervention, or include user intervention. The method modifies the layout related to the region of overlap according to the results of the previous decision. That is, for each determined region of overlap, this method decides whether or not to modify the overlap. A mask modification method is then selected if—based on a modification criterion—modification of the overlap is chosen. The method makes the necessary modifications as dictated by the decisions and selected methods arrived at in the previous step.

As above, this method further includes the grouping of any regions of overlap into a set such that all the overlaps in the same group are similarly modified. The possible modifications are the same as those described in the previous method (i.e., reversing the overlap of the two designs, or determining a dividing line, e.g., the medial axis between the two dies of the design and adjusting the mask of each design accordingly).

One example of the kind of decisions and resulting modifications that might be made by this method concerns the printing of flaps and main panels. According to an embodiment applicable to the design of packages that may include a plurality of main panels and none or more flaps, the method includes identifying the parts of the packages in each overlap region. The modification criterion includes that the bleed of a main panel may overlap a flap, that a flap may overlap another flap, that a flap may not overlap a main panel, and that the mask split method is applied when the bleed of a main panel overlaps another main panel. In an alternate embodiment, the mask split is applied to an overlap of two flaps. In yet another embodiment, the modification criterion includes comparing the colors of the images in an region of overlap. For example, in accordance to one implementation of such an embodiment, the image of a main panel may overlap a flap, and a flap may overlap another flap. The bleed of a flap's image, however, may or may not be allowed to overlap a main panel depending on the colors of the flap image and the main panel image. The criterion includes that if the colors of the flap and the main panel are the same, then the overlap is permitted. The criterion further includes that if there is an overlap between two printed flaps and the colors differ, then the mask split method is used. According to another embodiment, the criterion includes that a flap that has a visibly printed area may overlap a flap on which nothing is being printed. Yet another criterion version includes that a flap that has a visibly printed area may not overlap a flap that includes a "keep away"(non-print) area.

Once a modification criterion has been established, this method carries out the necessary modifications. In one version, the decided and other possible modifications are presented to the user prior to being carried out. In another, the modifications are carried out automatically.

Another version of the present invention is an apparatus for resolving overlaps in a layout including a plurality of possibly overlapping designs. This apparatus comprises a computer, including a means of inputting the layout. The computer is programmed to determine regions of overlap. The apparatus further comprises a user interface to the computer system including a display showing the overlap regions and a set of one or more possible modifications of the designs in the overlap regions and, similarly, one or more possible modifications to the regions of overlap. This apparatus also comprises a user interaction mechanism for a user to input a selection of none or one of the sets of possible modifications for any overlap region. The computer is programmed to modify the layout related to each region of overlap according to the user selection.

The method and apparatus for resolving overlaps in a layout including a plurality of possibly overlapping designs would allow, then, for both manual (i.e., based on user input) and automatic (e.g., based on a modification criterion) modifications of the designs in the overlap. The user would either make editorial decisions based on organized lists of overlap records provided by the initial, pre-GUI, stage of the process, or would rely on the automatic correction of any possible overlap conflicts as determined by a modification criterion. In either case, the occurrence of undesirable overlaps would be eliminated, resulting in a more efficient use of material and in the significant improvement of the printing of package and label designs.

BRIEF DESCRIPTION OF THE DRAWINGS

FIGS. 9A–9D show four steps of an example mask adjustment for two designs including a non-print area.

DESCRIPTION OF THE PREFERRED EMBODIMENTS

Figure 1:
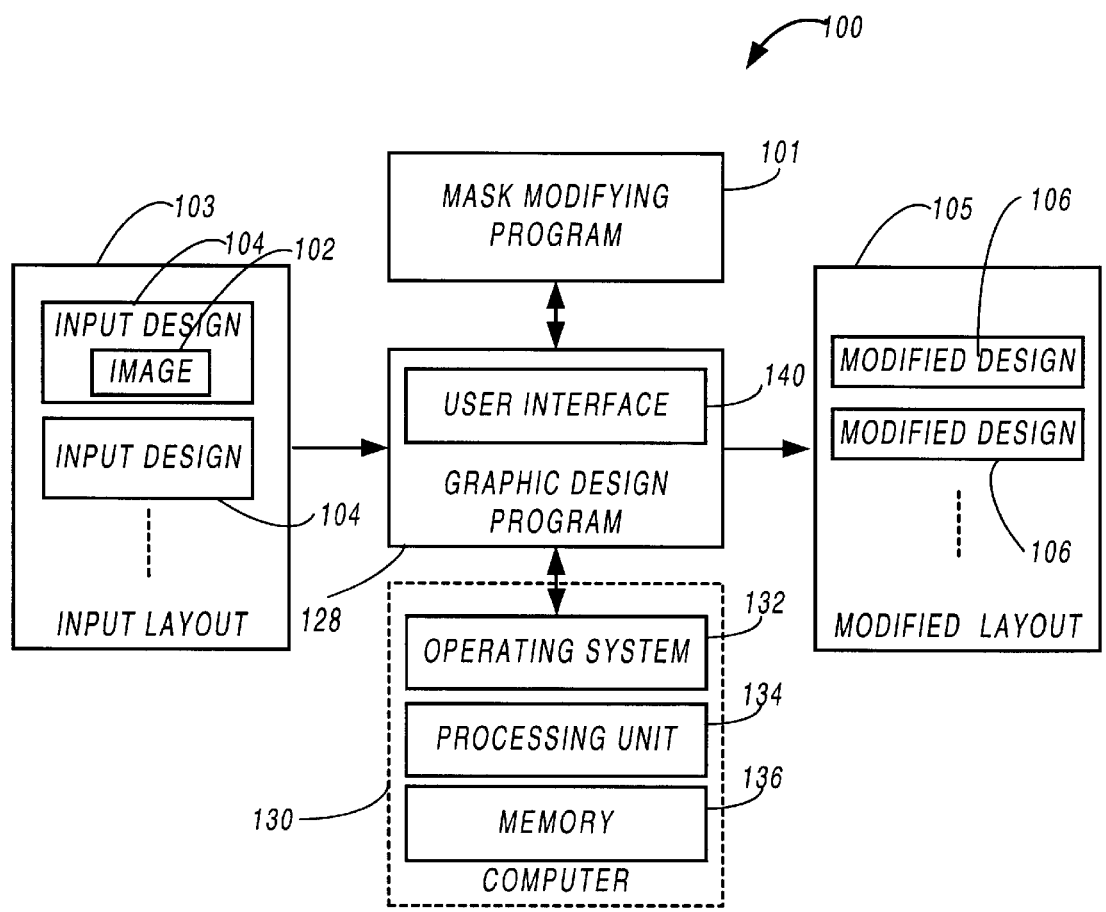
FIG. 1 shows a graphic design system on which the preferred embodiment of the present invention operates.

FIG. 1 shows a graphic design system 100 on which the preferred embodiment of the present invention operates. The preferred embodiment is a method implemented as a "mask adjusting" program 101 that is part of a graphic design program 128 that runs on a digital computer 130 that includes a memory 136 and processing unit 134. The graphic design program 128 runs under an operating system 132, and includes a user interface 140 that enables a user to interact with the design program 128. The mask-adjusting program 101 operates on an input layout 103 that includes a plurality of input designs 104 and generates a modified layout 105 that includes a plurality of modified designs 106.

Design system 128 happens to be a design system for packaging, that is, a system for preparing images for printing packages, labels, and other such items. The invention, however, is not restricted to any particular type of printing or any type of images.

Each of the input designs 104 includes an image 102. The image 102 may be any type of monochrome image or multi-component color image. Input layout 103 including input designs 104 may be in the form of a file on computer system 130, or a block of memory in memory 136, or any other form. The input layout 103 is provided in any format that describes how the job will be imaged on a printing plate. The format typically is in the form of a set of graphical objects such as one or more linework elements (including text), continuous tone (CT, contone) elements, paths (a set of vector or spline segments that describe a shape or set of line segments), bounding boxes ("invisible" rectangles that define the boundaries of an object), etc. The set of objects, for example, may be the results of interpreting a Page Description Language (PDL) file, such as a PostScript® file (Adobe Systems, San Jose, Calif.), or a file in any other PDL. Alternately, the layout may be in a display list format such as Barco Graphics GRO™ or GRS™ (Barco Graphics, Gent, Belgium, the assignee of the present invention).

Note that each design in layout 103 is not necessarily a repetition of the same design.

A die may be associated with each input design 104 and describes how the item (e.g., package or label) in the design is to be trimmed after printing. The die is a contour preferably defined as a contour or path element, i.e., a set of line segments, for example in vector form as is common in computer graphics. The die may alternatively be defined in raster form as a raster mask, or in any other form. It is assumed for the purpose of the preferred embodiment to be included as part of input design 104. Thus, a "design" or "station" as used herein includes the image of a package or label and may also include a single die. A design is a single instance of a package or label. Note that each image is designed for one specific die. However, multiple images may reuse the same die. The different images may represent, for example, different flavors of the same product, different colored versions of the same package, localized versions of a package for different markets using, for example, different languages, etc.

Furthermore, an image mask is assumed to be included with the image 102 of input design 104. The image mask describes the boundary of printing the image 102, and in many areas may extend beyond the die line because of a bleed applied to the image 102. In the preferred embodiment, the image mask is a clipping mask described by a contour or path graphical element, for example in vector form, and is included as part of the image. Alternatively, a raster mask may describe the image mask. If no explicit image mask is provided in the input design, then the image mask is assumed to be the boundary of the image.

In some situations, the die may be implicit rather than an explicit graphical object of the design 104. For example, in the case of a square cut label, the size and shape of the die may be assumed, so that there may not be an explicit path that describes the die.

Similarly, the image mask need not be an explicit graphical object. For example, the die and one or more parameters, for example, a bleed, may define the image mask. Thus, once a die is defined, specifying a 1 mm bleed defines the image mask as a contour 1 mm from the die line, without the image mask being an explicit object.

Figure 2A:
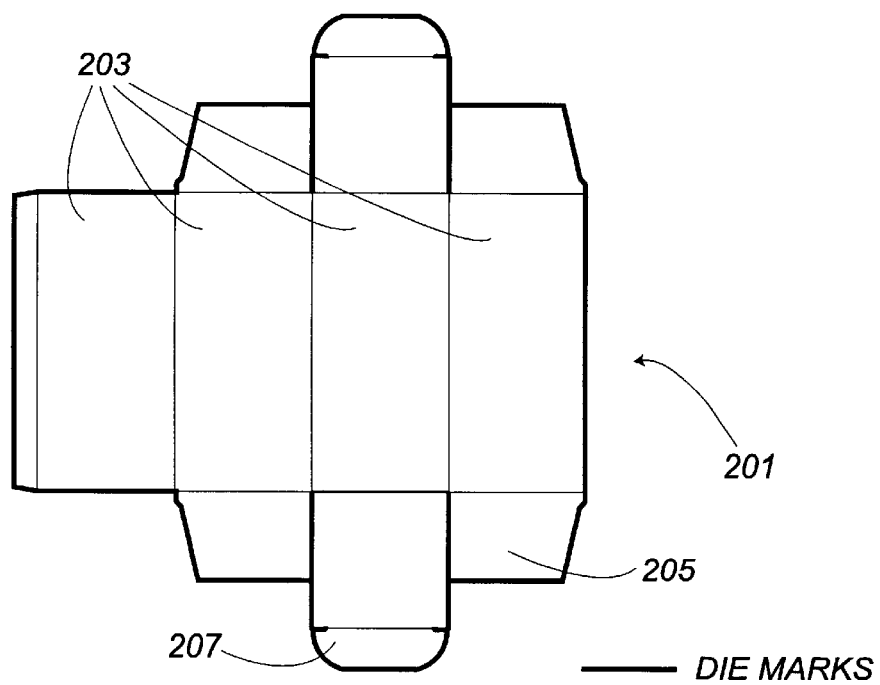
FIG. 2A shows a typical design of a box and FIG. 2B shows part of a layout of repeating copies of the design of FIG. 2A.

FIG. 2A shows a typical image 201 including the die marks. This image is for a carton that will be folded into a box shape after printing and cutting. Such a carton may include main panels 203, flaps such as dust flap 205, and lock tabs such as slit lock tab 207. Other types of elements of a package also are known.

A typical packaging design system in which the present invention may be incorporated may include a design editing application in which a design is created. Such an application would include the means to design a die for a package, import or create one or more different images for the design, and align the image with the die. Thus each die is associated with one or more images. The design editing application also includes means to create the image mask for the image.

Typical packages also include certain printed markings, such as registration marks, crop marks, station numbers, textual information such as customer name, filename, date, etc., and color strips or test patches, and the like. Some of these may lie outside the die and outside the image mask, while others may lie within the die, for example on a flap. We call such marks "design marks" or "station marks". A typical packaging design system includes the means to add design marks to the design.

A "design mask" is the entity that defines the border of everything that is in a design, including all design marks. In our preferred embodiment, the design mask is initially the bounding box of elements of a design. "Initially" because the mask modification process as carried out by the mask-adjusting program 101 normally modifies the design mask. In an alternate implementation, the design mask is the union of the image mask and the design marks boundary such that the design mask extends to the outermost of the image mask and the design mark boundary. In yet another alternate embodiment, the design mask is the union of the image mask, the design marks boundary, and the die such that the design mask extends to the outermost of the image mask, the design mark boundary, and the die.

Referring to the example of FIG. 2A, 201 thus shows a single design, including the die, the image, and the image mask. No design marks are included here.

Note that the invention does not depend on there being a separate design mask and image mask. In an alternate embodiment, only a single mask is used that defines the boundary of the matter to be printed in a design. That single mask could be the image mask after design marks have been added to the image. In such a case, the description below would have the image mask and the design mask being equivalent.

Note also that the printing area of a printing press is typically much larger than the area of a single design, so multiple designs are normally printed on the medium. The packaging design system may include the means to layout multiple designs for printing on the medium. In general, the different designs in a layout may be replicas of the same design. Alternatively, different designs may be arranged in the layout.

Figure 2B:
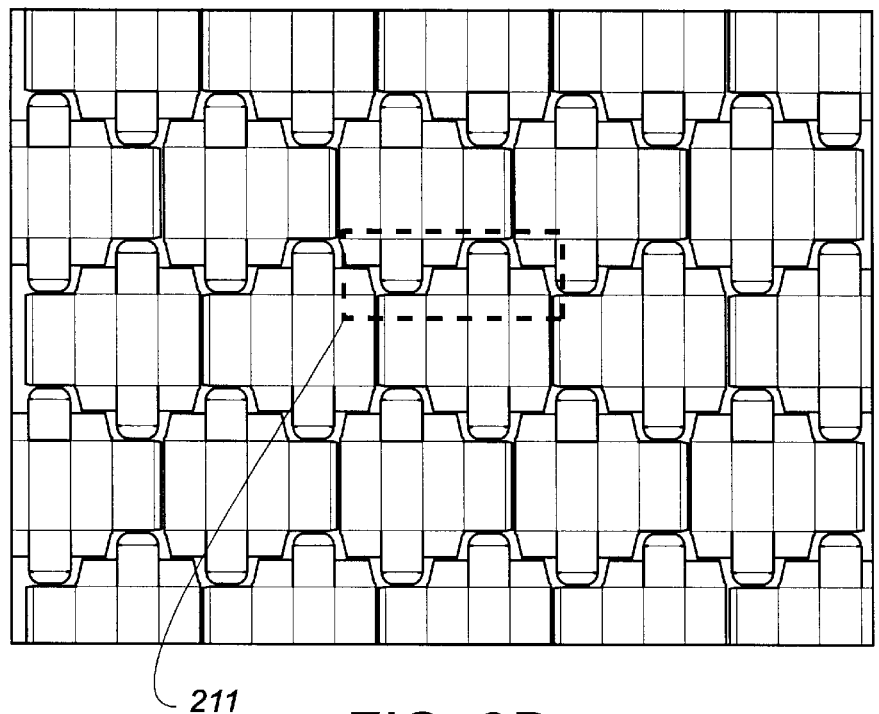

FIG. 2B shows as an example, part of a layout containing repeated versions of the design 201. This layout includes repetitions of design 201 and of a 180 degree rotated version of design 201.

Figure 3A:
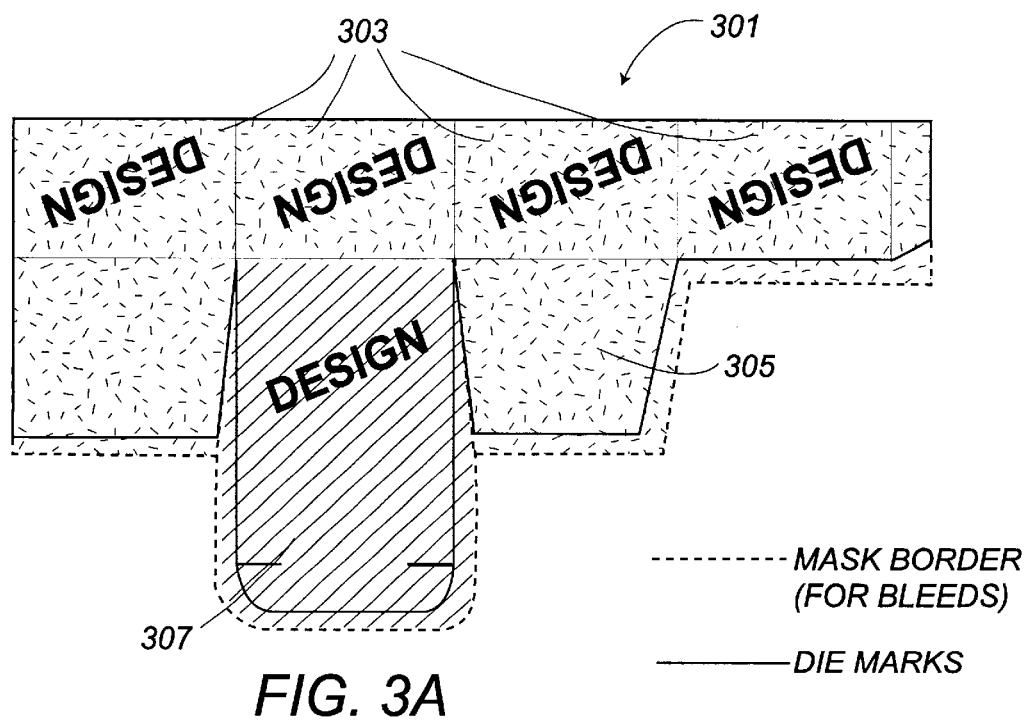
FIG. 3A shows part of a design and FIG. 3B shows the same part as FIG. 3A, but rotated 180 degrees.
Figure 3B:
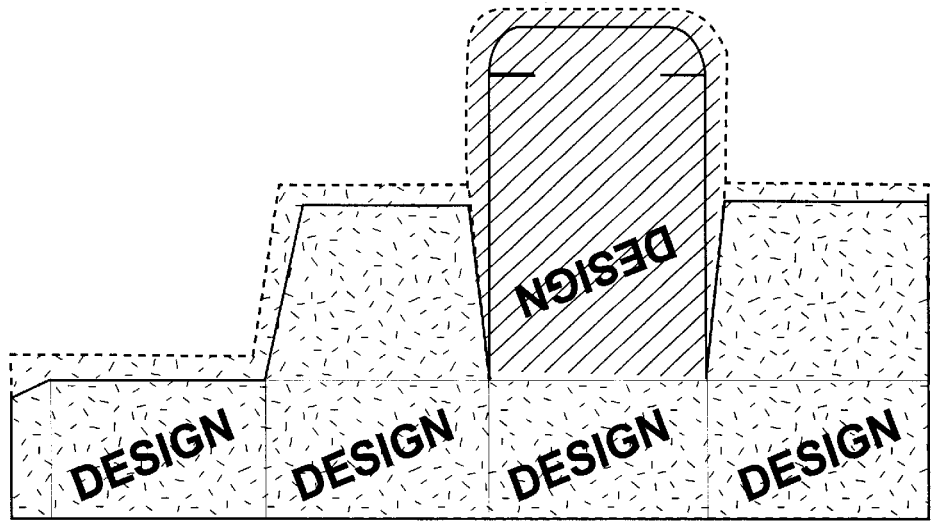

FIG. 3A shows part (301) of a design similar to the bottom right part of design 201 in more detail. FIG. 3B shows the same part 301 as FIG. 3A, but rotated 180 degrees. Note the panel parts 303, tab 307 and flap 305 on package part 301.

One implementation of the method of the invention is now described in detail. There are three main parts in this implementation:

Part 1. Identifying overlaps that may require adjustment decisions. In the preferred embodiment, this is the pre-graphical user interface (GUI) part of the method, and includes:
  (a) Creating a list of overlap records. This typically is a list of overlap records, each overlap record defining an independent region of overlap (e.g., a polygon) where one design overlaps another.
  (b) Grouping the list of overlap records into groups of overlap regions that share attributes such that the same mask trimming operations are to be performed on all overlaps within the same group, and creating a second list in which similar overlaps are grouped together.

Part 2. Present the groups to the user, together with possible correction decisions. This includes making the mask correction decisions, presenting decisions to the user to allow the user to edit the correction decisions, and interactively editing the decisions. In the preferred embodiment, this is the GUI part of the method. Note that in alternate embodiments in which the decisions are made and executed automatically, those steps in part 2 that involve the user are not included, and the corrections are determined automatically for execution.

Part 3. Modify the masks in the layout per the edited decisions from part 2. In the preferred embodiment, this is the post-GUI part of the method.

Part 1(a) above generates a list of regions of overlap, in our case, independent polygons that are overlaps between 2 designs.

Part 1(b) is an improvement to reduce the number of operations required in the method. Some of the overlaps are similar in that such overlaps would be similarly modified. The improvement groups together all such overlaps so that they can be modified together, thus reducing the complexity of the modification operation. A simple example illustrates this. FIG. 6B shows a simple layout of four designs all overlapping each other. Ignoring the center cross overlaps, the reader will notice that there are two different groups of overlaps, the horizontally oriented overlaps, and the vertically oriented overlaps. Whatever is done to one of the horizontally oriented overlaps will be done to all other horizontally oriented overlaps. The operations on vertically oriented overlaps also are similar. Part 1(b) traverses the overlaps identified in Part 1(a) and groups together those overlaps that share one or more attributes, such that similar modifications are carried out to all overlaps in the same group.

Figure 5:
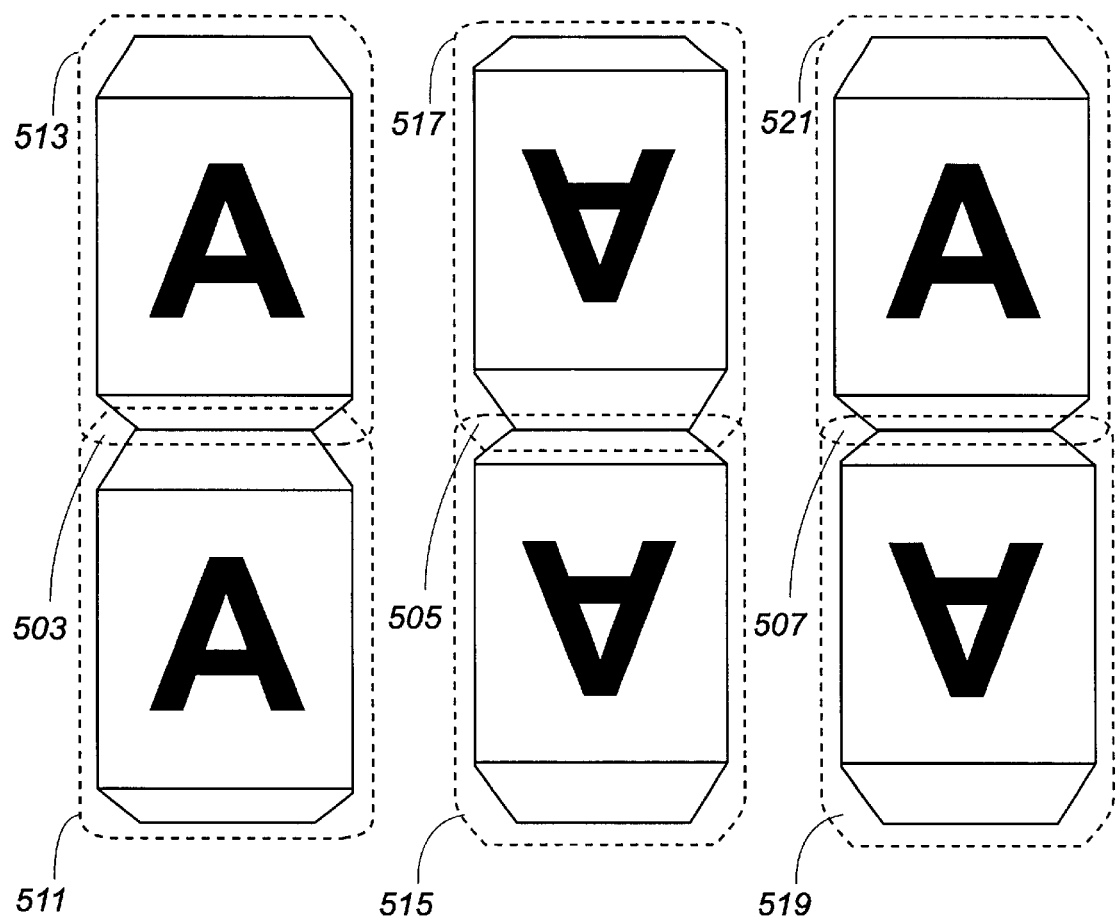
FIG. 5 and FIGS. 6A–6E show several examples of overlapping designs.

FIG. 5 shows another example of three pairs of overlapping designs, with regions of overlap 503, 505 and 507. The two left overlaps 503 and 505 are the same type of overlap and so will be grouped together, while the overlap 507 on the right is a different type of overlap and will not be grouped together with overlaps 503 and 505.

Some of the parts of this embodiment of the method are now considered in more detail.

The Design

Each design includes an image, an image mask defining the boundary of the image, a die, and possible design marks. We also define a design mask (also called station mask) which defines the boundary of the design. In our implementation the design mask is the bounding box of the design. The image mask preferably is a separate element restricting the boundary of the image.

The Pre-GUI Part

The Pre-GUI parts are as follows.
1(a) Create a List of All Overlaps
The list of overlaps is referred to as O. Creating O involves the following:
  (i) For each pair of designs in the layout:
    (A) Check if the designs do not overlap, and if not, go to the next pair of designs. In our embodiment, whether or not the designs could overlap is determined by whether or not the bounding boxes of the designs overlap. In an alternate embodiment, this step may compare design masks;
    (B) Check if die lines from the designs overlap, and if so, flag as an error and display an error message;
    (C) Check if the design masks of the two designs overlap. If not, go to next pair of designs. If there is an overlap, save the intersection of the design masks as a list, denoted P herein, of polygons, each denoted $P_n$, n=1, 2, . . . , with the list ending in 0. Each of the polygons $P_n$ is represented by a list of vertex (x, y) coordinates, preceded with a number m denoting the number of vertices. The vertices are listed in clockwise order. That is,
    P: $P_1$, $P_2$, . . . , 0
    $P_1$: m, $<X_1, Y_1>$, $<X_2, Y_2>$, . . . , $<X_m, Y_m>$
    . . .
    . . .
      where m is the number of vertices in $P_1$. In our embodiment, the design masks are initially boundary boxes, so the overlap polygons are rectangles. Later, as the design masks of one or more of the pair of designs may have earlier been modified, the overlap polygons become more complex;
    (D) For each disjoint polygon $P_n$ in P, create a record in an overlap list denoted O herein. The record contains a reference to the first design, a reference to the second design, the relationship of the first to the second design, including how the first design may be transformed onto the second design, and the overlap polygon. The format of each record on O is
    $<Des_A, Des_{B, TMAB}, P_n>$
      where
        $Des_A$ is a reference to the first design (design "A" herein). The reference may be a name, a pointer, index, or some other reference;
        $Des_B$ is a reference to the second design, called design "B" herein;
        $TM_{AB}$ is the relative transformation from designs A to design B, i.e., it transforms the coordinate system of A to the coordinate system of B, and includes such aspects as the translation of A's origin to become B's origin, any flipping of axes, etc.; and $P_n$ is the disjoint intersect polygon between the two designs.

Many methods for defining a transformation such as $TM_{AB}$ are known in the field of computer graphics, and any may be used. In our implementation, the transformation $TM_{AB}$ is defined by a 3 by 3 matrix. Consider again the example shown in FIG. 5. Overlaps 503 and 505 of the two left pairs represent a similar overlap, i.e., these two overlaps should be grouped together in part 1(b). The overlap 505 on the right is different. The transformation from design 511 to design 513 is

[1 0 0
0 1 0
0 Y 1], where Y is the vertical distance from the origin of design 511 to the origin of design 513. The transformation from design 519 to design 521 is defined by the matrix

[−1 0 0
0 −1 0
0 Y 1], where Y is the vertical distance from the origin of 519 to that of 521.

Several examples are now considered to illustrate how part 1(a) is carried out.

EXAMPLE 1

Figure 6A:
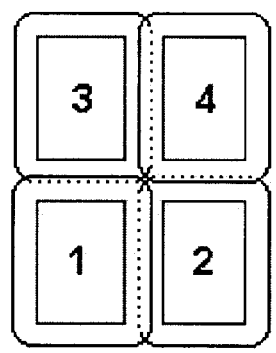
Figure 6B:
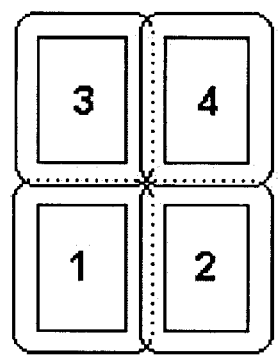

The first example is shown in FIG. 6A which includes four designs denoted by subscripts 1, 2, 3, and 4, respectively, i.e., as $Des_1$, $Des_2$, $Des_3$, and $Des_4$. While these designs are laid out in a rectangular grid, the method does not depend on orthogonal grids of designs; this is used for simplicity in the examples.

The index is shown in the middle, so the bottom left design is $Des_1$, then moving counterclockwise, the other designs are $Des_2$, $Des_3$, and $Des_4$. For this simple 4-up example, the following list is created:

<$Des_1$, $Des_2$, $T_X(X_1)$, $P_{12}$>
<$Des_1$, $Des_3$, $T_Y(Y_1)$, $P_{13}$>
<$Des_2$, $Des_4$, $T_Y(Y_1)$, $P_{24}$>
<$Des_3$, $Des_4$, $T_X(X_1)$, $P_{34}$>

In this list, $T_X(X_1)$ is the transformation of moving horizontally to the right by distance X, $T_Y(Y_1)$ is the transformation of moving vertically by distance $Y_1$, $P_{12}$ is the overlap between designs 1 and 2, etc.

Note that the image in each design is not yet referenced. Note also that our method ignores the order of overlap (the layering). The same results are produced if design 1 is beneath designs 2 and 3, as shown, for example, in FIG. 6B.

Each entry in the list is a lapped area where one design overlaps another. Depending on the shape of the design masks, two overlapping designs could produce more than one entry in the list, for example by intersecting in independent areas. The ordinal design numbers are guaranteed to be different, but at this point the die areas and images in the dies may or may not be the same.

EXAMPLE 2

Figure 4A:
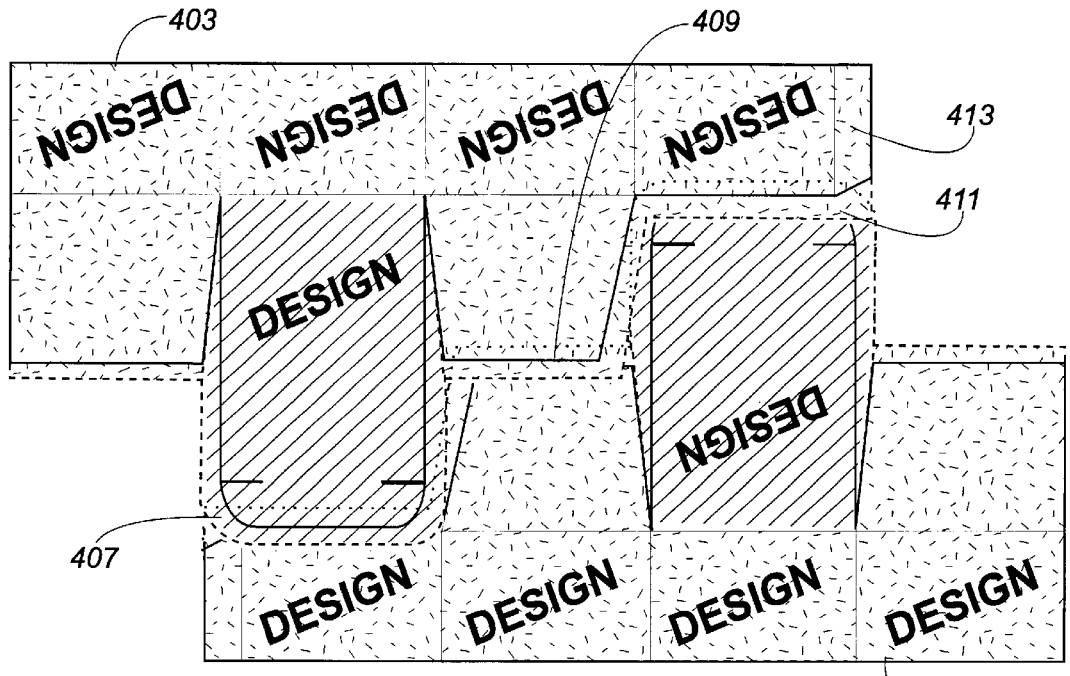
FIG. 4A shows the part shown in FIG. 3A overlapping that of FIG. 3B with some undesired regions of overlap.

This example is the overlap of the design of FIG. 3A with that of FIG. 3B, and is shown in FIG. 4A. FIG. 4A could be, for example, part of enlargement 211 of layout 201 (see FIG. 2) including the bottom right corner of a design and the same corner rotated 180 degrees.

Note that the image mask of top design 403 overlaps that of the lower design 405 at three locations. The first, denoted 407, is the overlap of a slit lock tab on top of a main panel of design 405. The second, at 409, is an overlap of two dust flaps. The third, at 411, is an overlap of the main panel of design 403 on top of the slit lock tab of design 405.

In our embodiment, the design mask of each design is initially the bounding box of each design. In this case, there is a single overlap polygon between these two designs, which is shown as rectangle 406 in FIG. 4B.

Figure 4B:
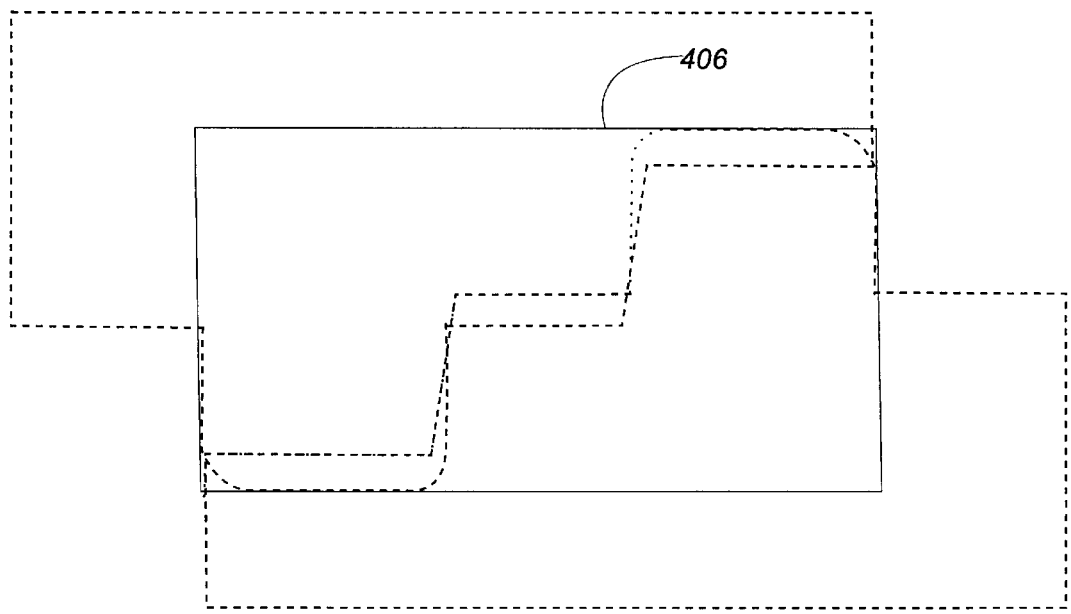
FIG. 4B shows a single overlap polygon for the overlapping designs of FIG. 4A.
Figure 4C:
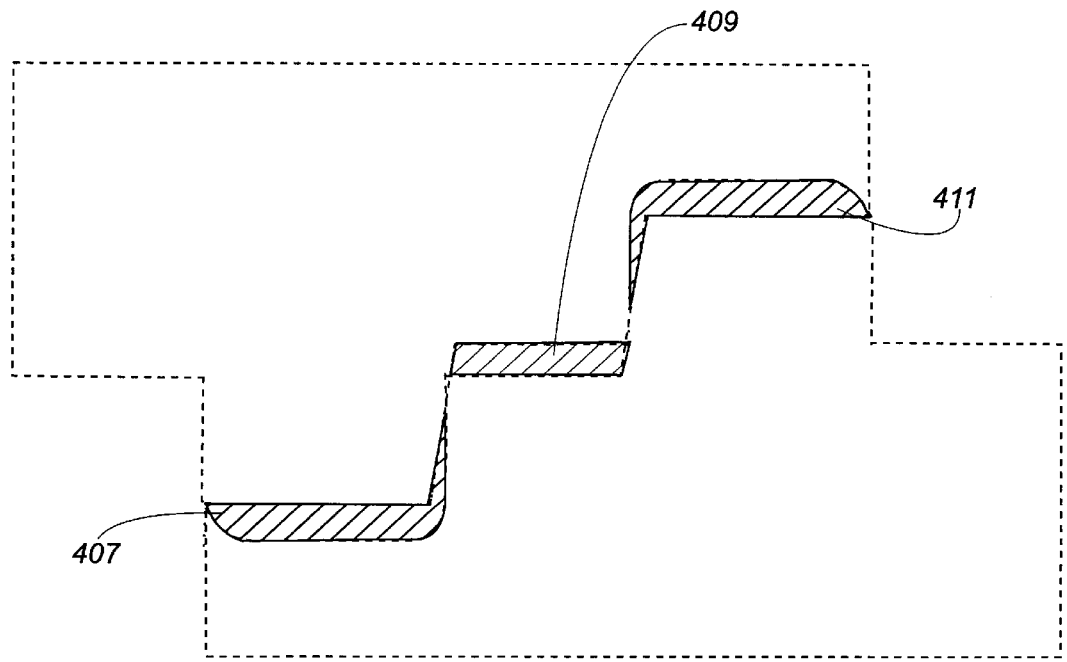
FIG. 4C shows the three overlap regions that would result from an alternate definition of the design mask.

In an alternate embodiment, the design mask is the union of the image mask and the boundary of any design marks. In such a case, this example produces three overlap records, the overlap 407 of the tab of 403 on top a main panel of 405, overlap 409 of the two flaps, and overlap 411 of the main panel of 403 on top of the tab of design 405. These three overlaps are shown in FIG. 4C.

Part 1(b), Creating a Second List Wherein Similar Overlaps are Grouped

The second list wherein similar overlaps are grouped is referred to as list G herein. Creating G involves the following:

(i) Add image information into the first list. That is, for an overlap of design A ($Des_A$) and design B ($Des_B$), expand the first list by adding the following information: $Img_A$, $Img_B$, referring to the image associated with design A, and the image associated with design B. Thus, the records are now expanded to the form <$Des_A$, $Img_A$, $Des_B$, $Img_B$, $TM_{AB}$, $P_{AB}$>.

Note that each image has a die to which it is associated. Thus, specifying an image also specifies the die. In alternate implementations, the dies may be referred to explicitly in the records of the list.

(ii) For each overlap in the list of overlaps O, search for a match $G_n$ in a list of groups G. A match occurs either if (A) the image names (and thus also the dies) agree with each other, and the transforms are effectively the same, considering numerical accuracy, etc., or (B) the image names agree with their opposite partners (A to B), and the inverse transforms are effectively the same.

If no match for this overlap can be found in the list of groups, a new group is created using the information from this overlap, and this overlap is added to the new group.

A group entry includes the following information

<$Img_A$, $Img_B$, $TM_{AB}$, $TM_{BA}$> where $TM_{BA}$ is the inverse of $TM_{AB}$.

The added overlap record contains the following information

<$Des_A$, $Des_B$>

If this overlap does match an existing group, then this overlap is simply added to that group. Note that in the case that the inverse transform is needed for the overlap record to match the group record, one reverses the order of the designs in the overlap record.

The following is pseudocode for these data structures:

```
class tuple {
    int a, b; // simply a number pair
}
typedef Array<tuple> tuple_list; // a list of // number
    pairs
```

```
class overlap_record {
  tuple station_pair;
  trafo a_to_b_tm; // a 3×3 TM
  contour_object overlap_poly;
}
typedef Array<overlap_record> overlap_list;
class group_record : overlap_record {
  // note, group_record contains a copy
  // of an overlap_record
  trafo b_to_a_tm;
  Lap_Type laptype; // overlap type (an enum)
  Tuple_list design_pair_list;
```

Note that in the pseudocode, a group record contains a list of overlaps (a Tuple_list), which corresponds to the <$Des_A$, $Des_B$> structure described herein above.

EXAMPLE 3

Figure 6C:
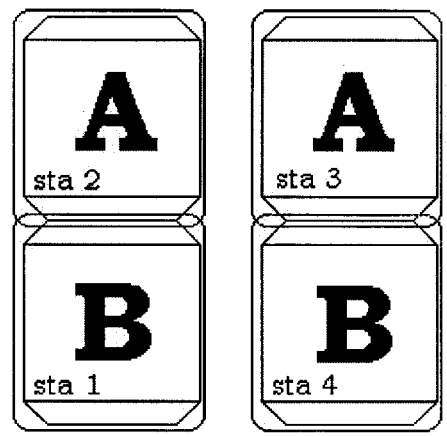
Figure 6D:
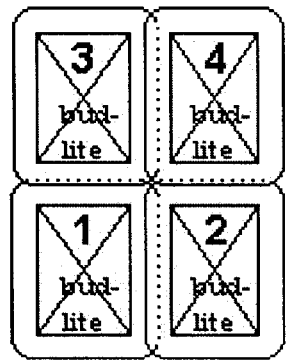

Example 3 is shown in FIG. 6D, and like Example 1 above, is a simple 4-up layout of designs. Suppose the name of the image is "budlite". Note that $TM_{12}=TM_{34}$ and $TM_{13}=TM_{24}$. For this example, the overlap list after expansion is:

<$Des_1$, "budlite", $Des_2$, "budlite", $TM_{12}$, $P_{12}$>
<$Des_1$, "budlite", $Des_3$, "budlite", $TM_{13}$, $P_{13}$>
<$Des_2$, "budlite", $Des_4$, "budlite", $TM_{24}$, $P_{24}$>
<$Des_3$, "budlite", $Des_4$, "budlite", $TM_{34}$, $P_{34}$>

The Group list is

Group A:
   <"budlite", "budlite", $TM_{12}$, $TM_{21}$, $P_{12}$>
      containing design overlaps <$Des_1$, $Des_2$> and <$Des_3$, $Des_4$>.

Group B:
   <"budlite", "budlite", $TM_{13}$, $TM_{31}$, $P_{13}$>
      containing design overlaps <$Des_1$, $Des_3$> and <$Des_2$, $Des_4$>.

EXAMPLE 4

Figure 6E:
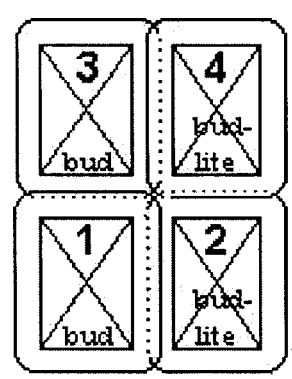

Example 4 is shown in FIG. 6E, and is similar to Example 3, with the same dies, but the name of both images on the left column is "bud", while that of the images on right column is "budlite". The overlap list after expansion is <$Des_1$, "bud", $Des_2$, "budlite", $TM_{12}$, $TM_{21}$, $P_{12}$>
<$Des_1$, "bud", $Des_3$, "bud", $TM_{13}$, $TM_{31}$, $P_{13}$>
<$Des_4$, "budlite", $Des_2$, "budlite", $TM_{24}$, $TM_{42}$, $P_{24}$>
<$Des_4$, "budlite", $Des_3$, "bud", $TM_{34}$, $TM_{43}$, $P_{34}$>

The group list is

Group A:
   <"bud", "budlite", $TM_{12}$, $TM_{21}$, $P_{12}$>
      which contains design overlaps <$Des_1$, $Des_2$> and <$Des_3$, $Des_4$>.

Group B:
   <"bud", "bud", $TM_{13}$, $TM_{31}$, $P_{13}$>
      which contains design overlap <$Des_3$, $Des_1$>.

Group C:
   <"budlite", "budlite", $TM_{24}$, $TM_{42}$, $P_{24}$>
      which contains design overlap <$Des_4$, $Des_2$>.

EXAMPLE 5

Example 5 is shown in FIG. 6C and contains two pairs of designs. The initial list of overlaps is <$Des_1$, $Des_2$, $TM_{+Y}$, $P_{12}$>
<$Des_3$, $Des_4$, $TM_{-Y}$, $P_{34}$>.

Note that $Img(Des_1) \neq Img(Des_3)$ so that match criterion (A) of Part 1(b)(ii) above fails. However, the alternate match criterion (B) of Part 1(b)(ii) above passes, verifying that these really are the same overlaps and should be grouped together. Match criterion 2 tests whether $Img(Des_1)=Img(Des_4)$ and $Img(Des_2)=Img(Des_3)$ and the inverse of $TM_{+Y}$ is $TM_{-Y}$, which is true, so we conclude that the two overlaps are in the same group.

GUI Stage

Figure 7:
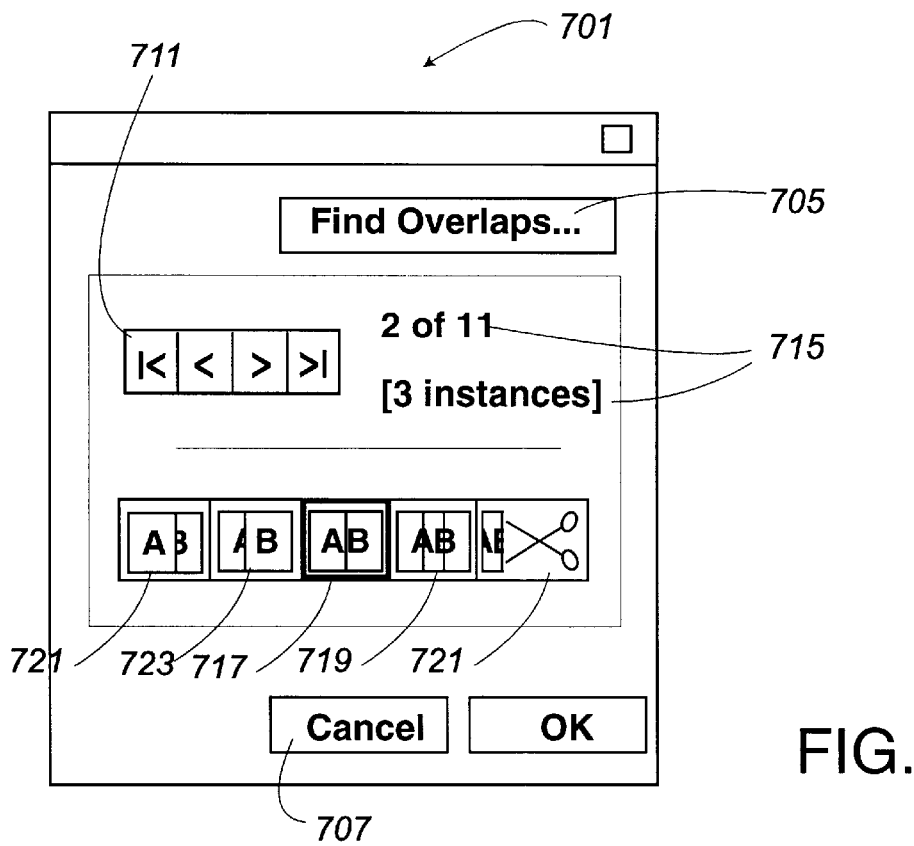
FIG. 7 shows one possible user interface for displaying possible modifications to the user.

The preferred embodiment user interface is shown in FIG. 7 as window 701. The user presses the "Find Overlaps" button 705 to scan a layout for overlap regions. This performs the determining of the list of overlaps and of the grouping, as described for part 1 above. At this stage, only the Find Overlaps button 705 and Cancel button 707 are active. There is a textual area 715 that includes a count of which overlap group is being highlighted on the main display of the layout, and how many instances (i.e., occurrences) there are in the group. Prior to the Scan button being pressed, the text reads "0 of 0" and "0 occurrences", in a dimmed font.

After the scan is performed, if one or more overlaps are found, all relevant buttons of user interface 701 become active. The text shows the number of groups. Buttons 711 are used to navigate via the groups. Clearly, means other than arrow buttons 711 may be used, as would be clear to one of skill in the art.

Highlighting and Feedback

For each group-record of an overlap of two designs, denoted design A and design B, respectively, the preferred embodiment method determines six adjusted masks: 1) the design masks for A and B in the case of design mask of A appearing to be on top of the design mask of B (denoted "A_OVER_B"), 2) the two design masks for the case of the mask of B appearing to be on top of the design mask of A (denoted "B_OVER_A"), and 3) the resulting design masks extending to a line dividing the area between the two dies in the region of the overlap, preferably to the medial axis between the two dies. This method is called the "split mask" method herein.

The possible modifications to choose are displayed as mask buttons 717–723. In addition, to help the user, the designs A and B are highlighted in different colors in the main display. In one embodiment, design A's design mask is displayed in translucent red, and design B's design mask in displayed translucent green. In an alternate implementation, a large "A" and a large "B" are displayed over the A design and the B design, respectively.

For each group, the decision determined in accordance to the method is displayed as a highlighted selection button, shown as button 717 in FIG. 7. The user may change the decision by manually clicking on the button of choice of the other buttons. Note that the choice of ignoring is also made possible (button 719). When a new choice is made, the highlighting changes to reflect the new option.

Once the mask modifying operation is selected, the main screen display changes to reflect the design mask changes that will be made.

The preferred embodiment suggests the split mask method, and requires user action to change the mask modification method. That is, if there is no further user intervention, the split mask method is used. That is, for any overlap of the images of two designs, the method includes determining a line dividing the two dies—preferably, the medial axis between the two dies—and adjusting the design mask of each design to the determined bisecting line, such that any bleed between the two dies extends only as far as the determined dividing line between the two dies.

Other user interfaces clearly are possible. In one alternate embodiment, a list of overlap groups is presented, with each row in the list corresponding to a group and containing the mask buttons similar to buttons 717–723, but without the ignore button since one can with this alternate user interface delete a row from the list with a backspace or delete key. In an improved version, the order of the group records in the list is sorted so that the "important" overlaps such as main panel to main panel are near the top of the list, and the "less interesting" overlaps are near the bottom.

Mask Adjustments

The adjustments of the design masks proceeds as follows, depending on which adjustment method is selected, whether automatically, or after editing by the user.

For a group with A_OVER_B selected: For all overlap records in the group, modify the masks of designs A and B according to the following procedure:

$$Mask_{Anew} = Mask_A - [Olap \cap (IMask_B - IMask_A)]$$

$$Mask_{Bnew} = Mask_B - [Olap \cap Mask_{Anew}]$$

where:

$Mask_{Anew}$ and $Mask_{Anew}$ are the modified (i.e., new) design masks for designs A and B, respectively;

$Mask_A$ and $Mask_B$ are the design masks before the modifying operation;

Olap is the overlap polygon;

$Imask_A$ and $Imask_B$ are the image masks of design A and design B, respectively; and $\cap$ is the intersection operation. Note that the operation of intersecting with Olap is carried out for the purpose of limiting the size of area removed from any design mask. So limiting the size of the area removed is important when the original overlap polygon is subdivided, using a process described below, and each overlap polygon treated separately.

Note that with this preferred mask adjustment, the resulting design mask is guaranteed to include all of the image of A within the image mask of A. The area removed from the design mask of station A is that part of the image mask of B that does not overlap with the image mask of A. That is, we give the highest priority to the image of A within A's image mask.

For a group with B_OVER_A selected: For all overlap records in the group, modify the mask of design A according to the following procedure, which is the same as above with A replaced by B.:

$$Mask_{Bnew} = Mask_B - [Olap \cap (Imask_A - Imask_B)]$$

$$Mask_{Anew} = Mask_A - [Olap \cap Mask_{Bnew}].$$

For a group with SPLIT selected: For all overlap records in the group, modify both designs' masks according to the following procedure:

$$Mask_{Anew} = Mask_A - [Olap \cap Split_B]$$

$$Mask_{Bnew} = Mask_B - [Olap \cap Split_A].$$

where $Split_A$ and $Split_B$ are respectively the A-side and B-side half planes of a dividing line determined between the dies of stations A and B.

In the preferred embodiment, the dividing line is the medial axis of the two dies. Thus the dividing line splits the overlap region in two, and $[Olap \cap Split_A]$ and $[Olap \cap Split_B]$ are the A and B sides of the split overlap region, respectively. Note that it is possible that the dividing line does not pass through Olap, in which case one station's mask is not modified.

Many methods are known for finding the medial axis. For example, in the case of each die being described by a polygon, the method determines the line that minimizes the distance to both die polygons.

For a group with "Ignore" selected: For all overlap records in the group, no mask modifications are carried out:

Note that by using these methods, no new elements are added to the database defining the layout. Furthermore, if the mask adjusting process is repeated on an already modified layout, only ignored overlaps would be detected. Furthermore, if the user at some later stage manually modifies some designs and repeats the mask adjusting process, the process should detect any new overlap and carry out (or suggest) the appropriate mask adjustment.

Note also that all operations are performed identically for each overlap in the same group.

As an alternative to mask adjusting, a different version of the invention can affect the changes by changing the layering of the designs rather than by changing the design masks. Thus, in the case of an overlap where station A is on top of station B, to change to B_OVER_A, the order of layering is changed.

Automatic Modification

According to another version of the invention, a method is described for resolving overlaps in printing layouts that contain a plurality of possibly overlapping designs that includes determining any regions of overlap in the layout, and, for each determined overlap region, deciding whether or not to modify the overlap region and, if modification is decided, selecting a mask modification method according to a modification criterion. The method modifies the layout related to the region of overlap according to the results of the previous decision. That is, for each determined region of overlap, this method decides whether or not to modify the overlap. A mask modification method is then selected if—based on a modification criterion—modification of the overlap is chosen. The method makes the necessary modifications as dictated by the decisions and selected methods arrived at in the previous step.

As in the above-described embodiment, the method further includes the grouping of any regions of overlap into a set such that all the overlaps in the same group are similarly modified. The possible modifications are the same as those described in the previous method, i.e., A_over_B, B_over_A, or the mask split method. Once a modification method is chosen for a group, the design masks of the designs in the group are adjusted accordingly.

One example of the kind of decisions and resulting modifications that might be made by this method concerns the printing of flaps and main panels. According to an embodiment applicable to the design of packages that may include a plurality of main panels and none or more flaps, the method includes identifying the parts of the packages in each overlap region. Each design thus has stored not only the image and mask, but also a classification of each area of the design. The classification may be, for example, being one of a main panel, lock tab, or flap. The modification criterion includes that the bleed of a main panel may overlap a flap, that a flap may overlap another flap, that a flap may not overlap a main panel, and that the mask split method is applied when a main panel overlaps another main panel. Alternatively, the mask split is applied to an overlap of two flaps.

The modification criterion may also include comparing the colors of the images in an region of overlap. For example, in accordance to one implementation, the image of a main panel may overlap a flap and a flap may overlap another flap. A flap's image, however, may or may not be allowed to overlap a main panel depending on the colors of the flap image and the main panel image. The criterion includes that if the colors of the flap and the main panel are the same, then the overlap is permitted. The criterion further includes that if there is an overlap between two printed flaps and the colors differ, then the mask split method is used.

According to another embodiment, the criterion includes that a flap that has a visibly printed area may overlap a flap not being printed on. An improved version of this rule is that a printed flap may overlap a non-printed tab unless a "keep-away" area has been defined on the non-printed flap or tab. A keep-away area is an area, typically of a flap, that is kept unprinted, for example in order to allow glue to tack thereto.

Once a modification method has been decided on according to the modification criterion, this method carries out the decided-on mask modifications. In one version, the decided-on and other possible modifications are presented to the user prior to being carried out. In another, the modifications are carried out automatically.

Alternative Dividing Lines

The preferred embodiment uses the medial axis between the two stations' dies for the dividing line. However some situations benefit from using a different dividing line. In one alternate embodiment, the dividing line is the medial axis of the overlap polygon. In yet another improved embodiment, the user can manually move the dividing line to a new location. These modified dividing lines are used the same way in calculating the design's masks, as described in the equations above.

Overlap Subdividing

Figure 8A:
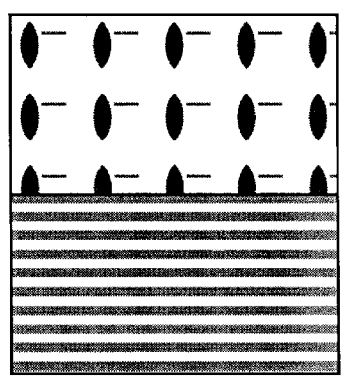
FIG. 8A shows a design with two equally sized images.
Figure 8B:
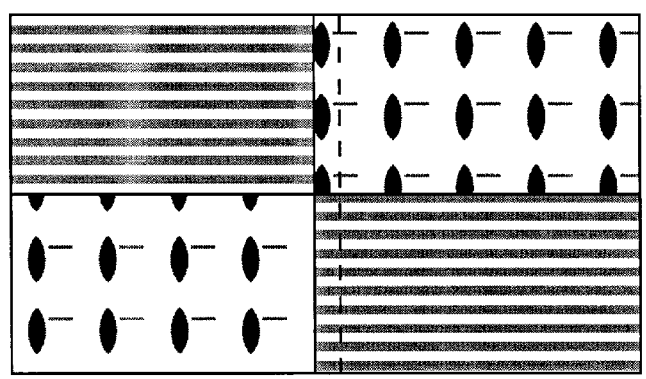
FIG. 8B shows a design overlapping example using the design of FIG. 8A overlapping with itself.

In yet another improved embodiment, the ability is provided to subdivide an overlap, e.g., an overlap polygon, into one or more overlaps, e.g., overlap polygons. This may be desirable in some situations. Thus, our improved embodiment permits the user to manually subdivide an overlap polygon into two or more overlap polygons, and then edit the adjust mask options separately for each subdivided polygon. One example of when this may be desirable is shown in FIGS. 8A and 8B. FIG. 8A shows a single design that has an image of two equal areas, each having a different color. FIG. 8B shows the design of FIG. 8A overlapping with an 180-degree rotated version of the same design. There is only one overlap region. None of the standard four options (A_OVER_B, B_OVER_A, SPLIT, no action) are optimal for this situation. In an improved embodiment, the user may subdivide the overlap polygon into sub-polygons, in this case two polygons. There then would be two overlaps of a pair of sub-polygons. Each may be treated separately.

The user interface of FIG. 7 shows button 721 for performing such a split.

In an alternate embodiment of the version that determines whether or not to modify any region of overlap and selects a mask modification method according to a modification criterion, one of the possible mask modification methods is to subdivide the overlap region into two or more subdivided overlap regions and repeat the deciding and modification selection step for the subdivided overlap regions. In one version, this occurs automatically. The preferred overlap dividing is into two equal overlap regions. Repeating the deciding and modification selection step may then lead to more overlap dividing until a mask modification solution is found that eliminates undesired overlaps.

In a particular embodiment wherein overlap dividing is one of the possible modification methods, the modification criterion may also include comparing the colors of the images in a region of overlap. The criterion includes that the image of a main panel may overlap a flap and a flap may overlap another flap. A flap's image, however, may or may not be allowed to overlap a main panel depending on the colors of the flap image and the main panel image. The criterion further includes that if the colors of the flap and the main panel are the same, then the overlap is permitted. The criterion further includes that if there is an overlap between two printed flaps and the colors differ, then the mask split method is used. If none of the A_over_B, B_over_A, or A_split_B solutions are applicable, then the mask is split. In one embodiment, the overlap region is divided automatically into two equal overlap regions.

EXAMPLE 6

To illustrate further, consider again the example of FIG. 4A, which shows the sections of design of FIGS. 3A and 3B overlapping. With our preferred definition of design mask, a single rectangular overlap region 406 would be determined, as shown in FIG. 4B. Again, none of the standard four options (A_OVER_B, B_OVER_A, SPLIT, no action) is optimal for this situation. Let design 403 be design A, and design 405 be design B. Location 407 is the region of overlap of a slit lock tab of design 403 (design A) on top of a main panel of design 405 (design B). For this, the user would like to have the main panel appear on top of the tab, the B_over_A resolution. Region 409 is an overlap of two dust flaps, and region 411 is an overlap of the main panel of design A on top of the same slit lock tab as in overlap 407, but of a different design, design B. The user would like to keep the main panel in region 411 on top of the tab, i.e., the A_over_B resolution. Since there is only one overlap region, none of the possible modifications is desirable.

Figure 4D:
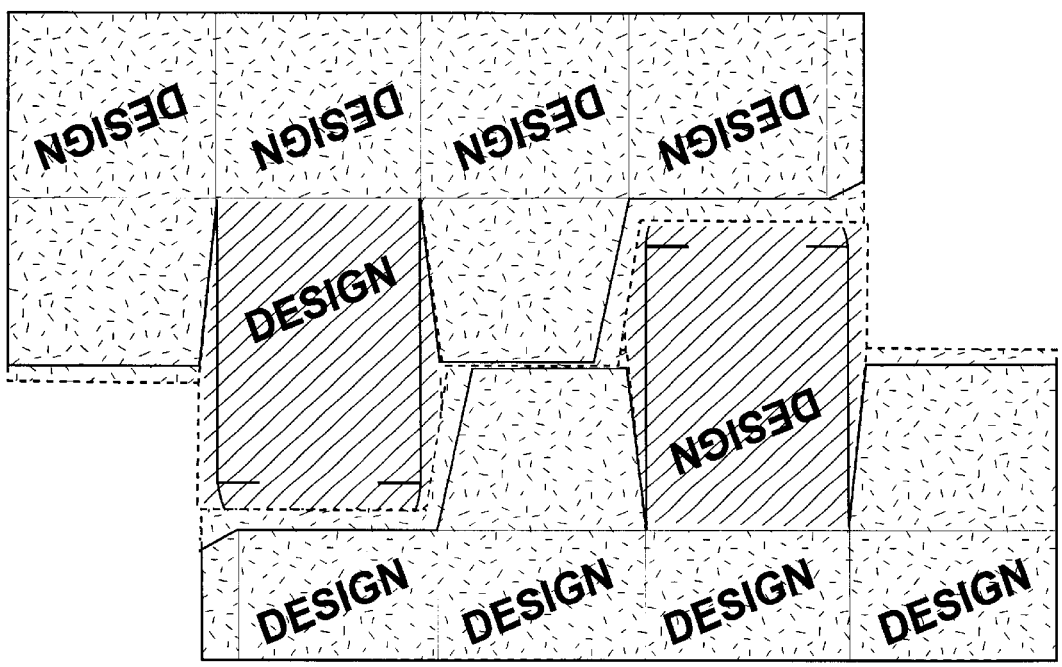
FIG. 4D shows one possible resolution of the regions of overlap in FIGS. 4A and 4C.

According to an improved embodiment, the user may subdivide the overlap polygon 406 (FIG. 4B) into three overlap polygons containing regions 407, 409, and 411, respectively. The user now can choose the B_over_A resolution for the polygon containing 407, the split mask modification for the overlap containing region 409, and the A_over_B modification for the overlap containing region 411. The result of this is shown in FIG. 4D.

EXAMPLE 7

This is the same example as Example 6. Alternatively, suppose that the alternate definition of design masks is used, so that there are initially three overlap polygons as shown in FIG. 4C.

In accordance with the improved embodiment that includes rule-based decisions, the areas of the designs include an identification. Thus the method knows which areas are tabs, flaps, or main panels. A modification criterion is used, and selects for each region of overlap the modification method that ensures that a main panel is on top of a tab or flap. In accordance with such an embodiment, the method would choose B_over_A for the overlap that includes 407, would choose A_over_B for the overlap that includes 411, and would choose A_split_B for the overlap that includes 409. The result of the mask adjusting is shown in FIG. 4D.

Keepaway (Non-Print) Areas

A non-print area (also called a keepaway area) is an area defined so that no printing occurs therein. Such an area may be included for various reasons, including to provide for improved adhesion of any adhesive applied thereto. The following is an example of one mask split method that can be applied to a design that includes one or more non-print areas. The example will be illustrated with the overlap of two designs shown in FIG. 9A which shows a left hand design with die line 901 and mask 903. The right hand design includes die line 907 and mask 905. A non-print area 909 is included.

1. Construct the dividing lines between the two die lines. In our implementation this is the midpath, i.e., the medial axis between the two die lines. This operation is illustrated in FIG. 9B wherein the medial axis dividing line is shown as line 911.
2. Trim back the mask line of one design to the dividing line. In the example of FIG. 9, the mask 905 of the right hand design is trimmed back to medial line 911 to form modified mask 915 as shown in FIG. 9C. Note that in general, this is not a permanent change to the mask line, but rather is used to determine the final masks.
3. Subtract the modified mask together with the outlines of any non-print areas from the mask of the design not modified in step 2. Repeat this step for the other design to deal with any non-print areas in the other design. This results in two modified masks that avoid non-print areas and that otherwise extend only to the dividing line between the two designs. The result of this final step is shown in FIG. 9D for the designs of FIG. 9A. The modified masks are masks 915 and 917 for the right and left side designs, respectively.

This can be expressed as the following formulas:

$$Mask_{Anew} = Mask_A - [Olap \cap Split_B] - \cup \{\text{non-print areas}\}$$

$$Mask_{Bnew} = Mask_B - [Olap \cap Split_A] - \cup \{\text{non-print areas}\}$$

Where $\cup$ is the union operation.

Thus, while one or more preferred embodiments have been presented, those skilled in the art will understand that various modifications may be made to the embodiments, and various alternatives of the invention are possible.

For example, the invention does not depend on there being two (or more) masks defined for each design. In alternative embodiments, only a single mask is used, such a mask defining the boundary of printing of the design on the medium. This mask, still called the design mask, is equivalent to the image mask. Adding design marks is still possible in the one mask implementation by including the design marks in the image. Having more than one mask allows one to distinguish among more areas and assign different priorities to these areas in making overlap modification decisions.

Furthermore, a mask in the preferred embodiment is an explicit graphical element defining a clipping mask. In alternate implementations, the mask may be any definition of the border of printing of the image, and need not be an explicit graphical element; any image inherently has a border or printing. Similarly, a die is any definition of a boundary, and need not be an explicit graphical element.

The scope of the invention is thus described only in the claims attached hereto, and in their legal equivalents.

We claim:

1. A method for resolving on a computer system overlaps in a layout including a plurality of possibly overlapping designs, each design including an image and a design mask defining the border of printing of the design, the method comprising:
   (a) determining any regions of overlap in the layout, each region of overlap being contained within at least two masks;
   (b) displaying on a user interface of the computer system the overlap regions and, for each overlap region, a set of one or more possible modifications of the designs in the overlap; and
   (c) for each region of overlap;
      (i) a user manually inputting to the computer system none or one of the set of possible modifications; and
      (ii) modifying or not the designs in region of overlap according to the user input of step (i),
   wherein each design further includes a die defining a contour,
   wherein each design includes none or more design marks and an image mask defining the border of printing the image, such that the design mask defines the border of printing the image and the design marks, and
   wherein the design mask of a particular design is initially the bounding box of all elements of the particular design.

2. A method for resolving on a computer system overlaps in a layout including a plurality of possibly overlapping designs, each design including an image and a design mask defining the border of printing of the design, the method comprising:
   (a) determining any regions of overlap in the layout, each region of overlap being contained within at least two masks;
   (b) displaying on a user interface of the computer system the overlap regions and, for each overlap region, a set of one or more possible modifications of the designs in the overlap; and
   (c) for each region of overlap:
      (i) a user manually inputting to the computer system none or one of the set of possible modifications; and
      (ii) modifying or not the designs in region of overlap according to the user input of step (i),
   wherein one of the possible modifications for any overlap of two designs is visually reversing the order of overlap of the two designs.

3. The method of claim 2, wherein visually reversing the order of overlap of the two designs is by modifying at least one of the design masks.

4. A method for resolving on a computer system overlaps in a layout including a plurality of possibly overlapping designs, each design including an image and a design mask defining the border of printing of the design, the method comprising:
   (a) determining any regions of overlap in the layout, each region of overlap being contained within at least two masks;
   (b) displaying on a user interface of the computer system the overlap regions and, for each overlap region, a set of one or more possible modifications of the designs in the overlap; and
   (c) for each region of overlap:

(i) a user manually inputting to the computer system none or one of the set of possible modifications; and (ii) modifying or not the designs in region of overlap according to the user input of step (i), wherein one of the possible modifications for any overlap of the images of two designs includes modifying at least one of the design masks, and wherein one of the possible modifications for any overlap of the images of two designs includes determining a dividing line between the two designs, and adjusting the design mask of each design to not extend beyond the determined dividing line, such that any design is printed only as far as the determined dividing line in the region of overlap of the two designs.

5. The method of claim 4, wherein each design further includes a die defining a contour, and wherein the dividing line is the medial axis between the two dies.

6. A method for resolving on a computer system overlaps in a layout including a plurality of possibly overlapping designs, each design including an image and a design mask defining the border of printing of the design, the method comprising:

(a) determining any regions of overlap in the layout each region of overlap being contained within at least two masks;

(b) displaying on a user interface of the computer system the overlap regions and, for each overlap region, a set of one or more possible modifications of the designs in the overlap; and (c) for each region of overlap:
  (i) a user manually inputting to the computer system none or one of the set of possible modifications; and
  (ii) modifying or not the designs in region of overlap according to the user input of step (i), wherein one of the possible modifications for any overlap of the images of two designs includes subdividing the overlap into a plurality of overlaps and repeating said steps (b) and (c) for the subdivided regions of overlap.

7. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks; and (b) for each determined region of overlap:
  (i) deciding whether or nor to modify the overlap region and for the case of modification, selecting a modification method; and
  (ii) modifying or not the layout related to the region of overlap according to result of the deciding and method selecting step, wherein the deciding and method selection in step (b)(i) is according to a modification criterion, and wherein one of the possible modifications to a particular overlap region between two designs includes subdividing the particular overlap region into a plurality of overlap regions, the method further including repeating step (b) for the subdivided regions of overlap.

8. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks; and (b) for each determined region of overlap:
  (i) deciding whether or nor to modify the overlap region and for the case of modification, selecting a modification method; and
  (ii) modifying or not the layout related to the region of overlap according to result of the deciding and method selecting step, wherein the deciding and method selection in step (b)(i) is according to a modification criterion, and wherein the designs in the layout are of one or more packages, each package including a plurality of main panels and none or more flaps, and wherein the method includes identifying whether the designs in each overlap region are of a main panel or a flap, and wherein the modification criterion includes that the image of a main panel may overlap the image of a flap and that the image of a flap may not overlap the image of a main panel.

9. The method of claim 8, wherein the modification criterion includes that the method selection selects a design mask split method for the case of a main panel overlapping another main panel, the design mask split method for an overlap of two designs including determining a line dividing the two designs, and adjusting the design mask of each design to not extend beyond the determined dividing line, such that any design is printed only as far as the determined dividing line between the two designs in the region of overlap of the two designs.

10. The method of claim 8, wherein the modification criterion includes that a flap that has a printed area may overlap a flap that is not being printed onto.

11. The method of claim 8, wherein one or more of the designs in an overlap includes none or more non-print areas, and wherein the modification criterion further includes that a printed flap may not overlap a non-print area.

12. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks; and (b) for each determined region of overlap:
  (i) deciding whether or not to modify the overlap region and for the case of modification, selecting a modification method; and
  (ii) modifying or not the layout related to the region of overlap according to result of the deciding and method selecting step, wherein the deciding and method selection in step (b)(i) is according to a modification criterion, wherein the deciding step includes comparing the colors of the images in an region of overlap, and wherein the modification criterion includes whether or not the colors of the images are different, and wherein the designs in the layout are of one or more packages, each package including a plurality of main panels and none or more flaps, and wherein the method includes identifying whether the designs in each overlap region are of a main panel or a flap, and wherein the modification criterion further includes if there is an overlap between two printed flaps and the colors differ, then selecting a design mask split method as the modification method, the design mask split method for an overlap of two designs including determining a line dividing the two designs, and adjusting the design mask of each design to not extend beyond the determined dividing line, such that any design is printed only as far as the determined dividing line between the two designs in the region of overlap of the two designs.

13. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks; and (b) for each determined region of overlap:
(i) deciding whether or nor to modify the overlap region and for the case of modification, selecting a modification method; and
(ii) modifying or not the layout related to the region of overlap according to result of the deciding and method selecting step, wherein each design further includes a die defining a contour, wherein each design includes none or more design marks and an image mask defining the border of printing the image, such that the mask is a design mask defining the border of printing the image and the design marks, and wherein the design mask of a particular design is initially the bounding box of all elements of the particular design.

14. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks;

(b) for each determined region of overlap:
(i) deciding whether or nor to modify the overlap region and for the case of modification, selecting a modification method; and
(ii) modifying or not the layout related to the region of overlap according to result of the deciding and method selecting step, wherein one of the possible modification methods for any overlap of two designs includes visually reversing the order of overlap of the two designs.

15. The method of claim 14, wherein visually reversing the order of overlap of the two designs includes modifying at least one of the design masks.

16. A method for resolving on a computer system overlaps in a layout including a plurality of possibly overlapping designs, each design including an image and a design mask defining the border of printing of the design, the method comprising:

(a) determining any regions of overlap in the layout, each region of overlap being contained within at least two masks;

(b) for each determined region of overlap:
(i) deciding whether or nor to modify the overlap region and for the case of modification, selecting a modification method; and
(ii) modifying or not the layout related to the region of overlap according to result of the deciding and method selecting step, wherein one of the possible modification methods for any overlap of the images of two designs includes modifying at least one of the design masks, and wherein one of the possible modification methods for any overlap of the images of two designs includes determining a dividing line between the two designs, and adjusting the design mask of each design to not extend beyond the determined dividing line, such that any design is printed only as far as the determined dividing line in the region of overlap of the two designs.

17. The method of claim 16, wherein each design further includes a die defining a contour, and wherein the dividing line is the medial axis between the two dies.

* * * * *

UNITED STATES PATENT AND TRADEMARK OFFICE
CERTIFICATE OF CORRECTION

PATENT NO. : 6,760,638 B1
DATED : July 6, 2004
INVENTOR(S) : Love et al.

It is certified that error appears in the above-identified patent and that said Letters Patent is hereby corrected as shown below:

<u>Column 8,</u>
Line 59, please change "$<Des_A, Des_{B, TMAB}, P_n>$" to -- $<Des_A, Des_B, TM_{AB}, P_n>$ --.

<u>Column 11,</u>
Line 14, please change "a group record contains" to -- a group_record contains --.

<u>Column 18,</u>
Line 16, please change "for each region of overlap;" to -- for each region of overlap: --.

Signed and Sealed this

Tenth Day of August, 2004

JON W. DUDAS
*Acting Director of the United States Patent and Trademark Office*